(12) United States Patent
Stegelmann et al.

(10) Patent No.: US 8,403,780 B2
(45) Date of Patent: Mar. 26, 2013

(54) TENSIONER

(75) Inventors: Oliver Stegelmann, Strathroy (CA); Xinjian Fan, Novi, MI (US)

(73) Assignee: The Gates Corporation, Denver, CO (US)

( * ) Notice: Subject to any disclaimer, the term of this patent is extended or adjusted under 35 U.S.C. 154(b) by 1029 days.

(21) Appl. No.: 12/004,537

(22) Filed: Dec. 21, 2007

(65) Prior Publication Data
US 2009/0163312 A1    Jun. 25, 2009

(51) Int. Cl.
*F16D 3/00* (2006.01)
(52) U.S. Cl. .......... 474/94; 474/133; 474/134; 474/135; 474/136; 474/138
(58) Field of Classification Search .............. 474/94, 474/133–138; 267/153, 154, 279
See application file for complete search history.

(56) References Cited

U.S. PATENT DOCUMENTS

| | | | |
|---|---|---|---|
| 3,975,965 A | | 8/1976 | Speer ................... 74/242.11 R |
| 5,190,502 A | * | 3/1993 | Gardner et al. ............... 474/135 |
| 5,803,849 A | * | 9/1998 | Ayukawa ........................ 474/94 |

* cited by examiner

*Primary Examiner* — Robert A Siconolfi
*Assistant Examiner* — James Hsiao
(74) *Attorney, Agent, or Firm* — J. A. Thurnau, Esq.; P. N. Dunlap, Esq.

(57) ABSTRACT

A tensioner comprising a base comprising a first portion, an arm comprising a second portion, the arm pivotally connected to the base, a pulley journalled to the arm, a resilient member compressively disposed between the first portion and the second portion, the resilient member comprising a gap within which the first portion and the second portion are disposed, and the resilient member comprising a bore, the bore engaging the arm.

4 Claims, 5 Drawing Sheets

TENSIONER

FIELD OF THE INVENTION

The invention relates to a tensioner, and more particularly, to a tensioner comprising a resilient member within which a base first portion and an arm second portion are cooperatively disposed.

BACKGROUND OF THE INVENTION

In numerous applications where endless power transmission devices are employed it is often desirable or necessary to control the tension in such devices during movement thereof around associated sheaves, pulleys, sprockets or the like, to assure optimum operating efficiency.

Numerous tensioning devices such as belt tensioning devices have been proposed heretofore and most of these devices employ metal spring devices, hydraulic devices, or pneumatic devices to provide the tensioning action whereby such devices are comparatively complicated and expensive and require considerable maintenance. Accordingly, there is a need for a simple and inexpensive tensioning apparatus capable of providing reliable performance over an extended service life.

Representative of the art is U.S. Pat. No. 3,975,965 (1976) which discloses a tensioning apparatus for an endless power transmission device is provided and utilizes the elastic properties of an elastomeric material to provide the tensioning action and such apparatus is supported adjacent the endless power transmission device to be tensioned and has components thereof operatively associated with the elastomeric material and with the device.

What is needed is a tensioner comprising a resilient member within which a base first portion and an arm second portion are cooperatively disposed. The present invention meets this need.

SUMMARY OF THE INVENTION

The primary aspect of the invention is to provide a tensioner comprising a resilient member within which a base first portion and an arm second portion are cooperatively disposed.

Other aspects of the invention will be pointed out or made obvious by the following description of the invention and the accompanying drawings.

The invention comprises a tensioner comprising a base comprising a first portion, an arm comprising a second portion, the arm pivotally connected to the base, a pulley journalled to the arm, a resilient member compressively disposed between the first portion and the second portion, the resilient member comprising a gap within which the first portion and the second portion are disposed, and the resilient member comprising a bore, the bore engaging the arm.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
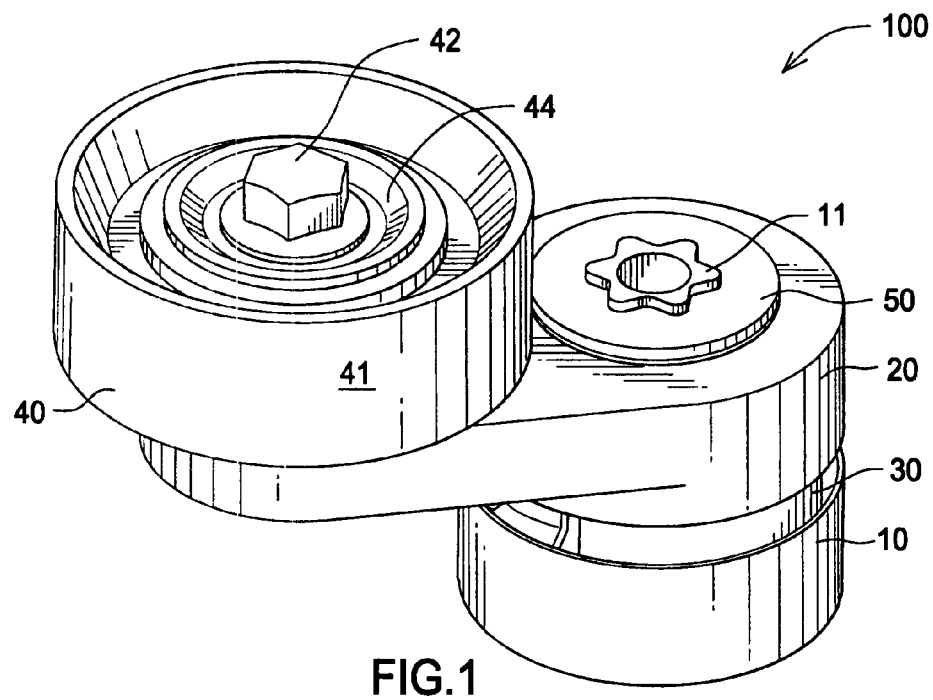
FIG. 1 is a perspective view of the tensioner.

FIG. 1 is a perspective view of the tensioner. Tensioner 100 comprises a base 10. Arm 20 is pivotally connected to base 10. Disposed between arm 20 and base 10 is resilient member 30. Resilient member 30 biases arm 20 against a belt (not shown) in order to apply a force (load) to the belt.

A pulley 40 is journalled to the arm 20. The belt (not shown) engages a surface 41 of pulley 40. Pulley 40 rotates about bolt 42 on bearing 43.

Arm 20 pivots about post 11. Retainer 50 is used to retain arm 20 in proper operational connection to base 10 and resilient member 30. A low-friction sleeve 60 is disposed between arm 20 and post 11.

Figure 2A:
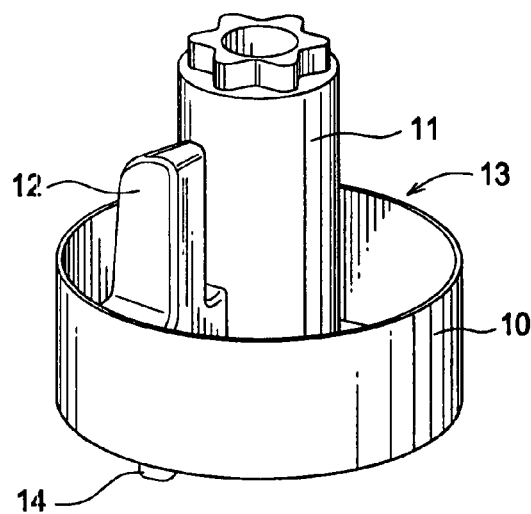
FIG. 2a is a perspective view of the base.

FIG. 2a is a perspective view of the base. Base 10 comprises a post 11 which extends therefrom. Portion 12 extends upward from base 10 into recess 13. Portion 12 is not connected to the length of post 11 so that portion 12 does not interfere with skirt 22 or sleeve 60.

Tab member 14 projects from base 10 to engage a mounting surface, such as an engine block (not shown). Tab member 14 prevents rotation of base 10 during operation and assures proper orientation during final assembly on a mounting surface.

Figure 2B:
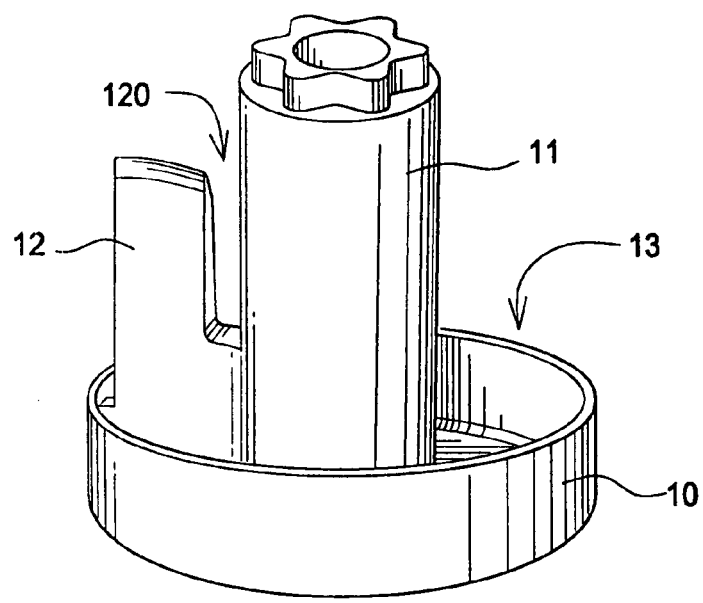
FIG. 2b is a side view of the base.

FIG. 2b is a side view of the base. Gap 120 is disposed between portion 12 and post 11 to allow clearance for skirt 22 and sleeve 60.

Figure 3:
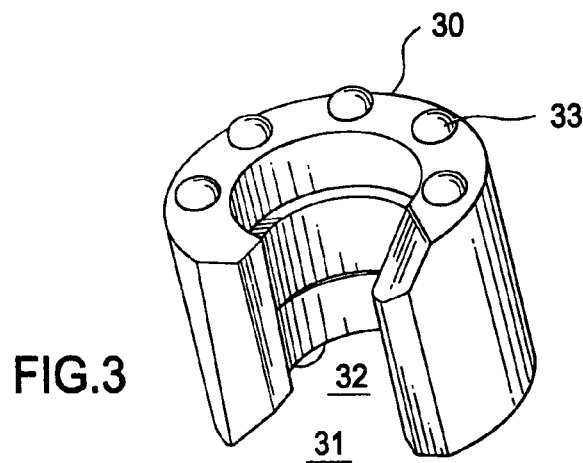
FIG. 3 is a perspective view of the resilient member.

FIG. 3 is a perspective view of the resilient member. Resilient member 30 substantially describes a "C" shape. As such resilient member 30 comprises a gap 31 which cooperatively engages portion 12 in base 10 and portion 21. Resilient member further comprises a bore 32 which engages arm skirt 102. Resilient member 30 also engages base 10 within recess 13 and arm 20. Resilient member 30 further comprises projections 33 which engage arm 20 and base 10. Projections 33 are used to bias arm 20 in to the proper operating position, and thereby maintain a proper pulley position with respect to a belt (not shown).

Resilient member 30 comprises any known natural or synthetic rubber material, or suitable combination of the two. The spring rate of resilient member 30 may be selected by changing the thickness, height or durometer of the material.

Figure 4B:
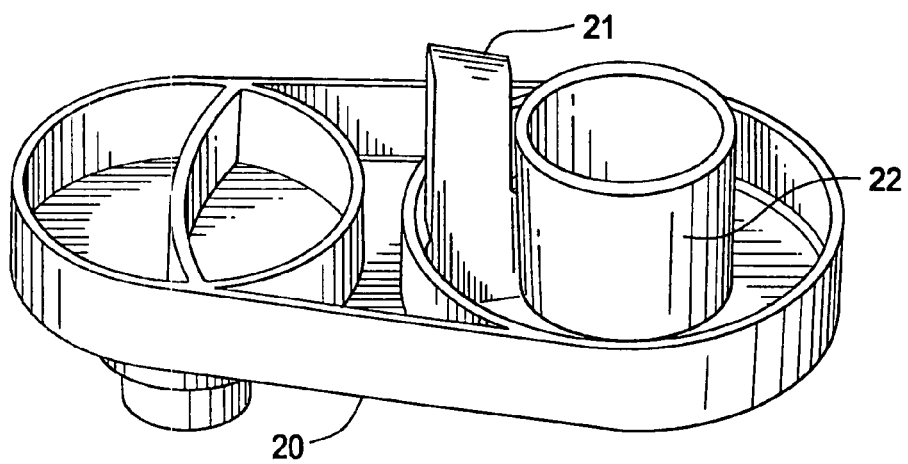
FIG. 4b is a perspective bottom view of the arm.
Figure 4A:
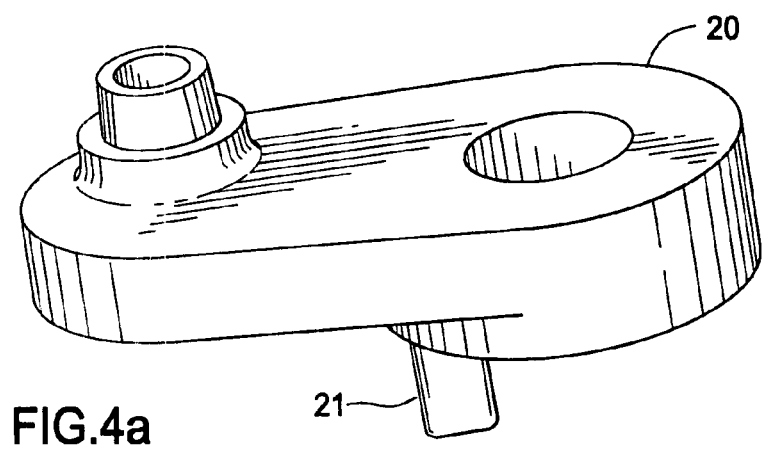
FIG. 4a is a perspective view of the arm.

FIG. 4a is a perspective view of the arm. Portion 21 extends from arm 20 so as to extend within gap 31 in resilient member 30. Portion 21 engages resilient member 30 so as to compress resilient member 30.

FIG. 4b is a perspective bottom view of the arm. Skirt 22 extends toward base 10. Bore 32 of resilient member 30 engages skirt 22. See FIG. 8.

Figure 5:
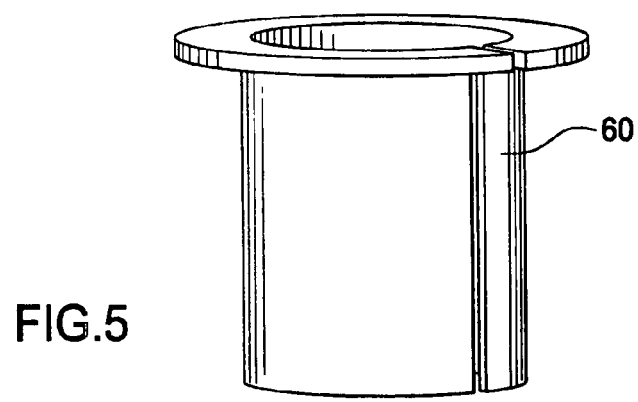
FIG. 5 is a perspective view of the sleeve.

FIG. 5 is a perspective view of the sleeve. Sleeve 60 is cylindrical in shape. Sleeve 60 extends between arm 20 and post 11. Sleeve 60 is a low friction material in order to facilitate movement of arm 20. In an alternate embodiment, sleeve 60 may comprise a predetermined coefficient of friction with the arm 20 whereby a movement of arm 20 is damped, so as to damp arm oscillations.

Figure 6:
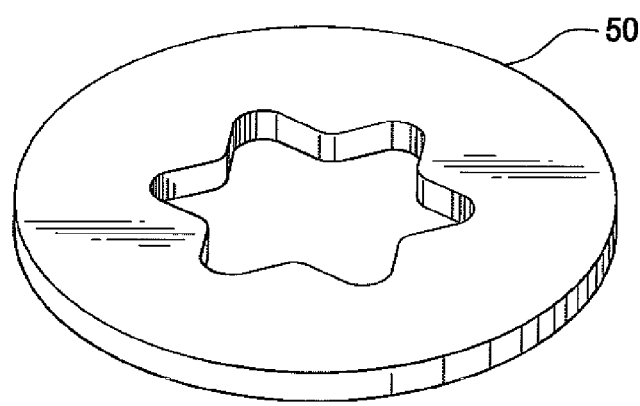
FIG. 6 is a perspective view of the retainer.

FIG. 6 is a perspective view of the retainer. Retainer 50 engages post 11 to hold arm 20 and resilient member 30 in proper position in base 10.

Figure 7:
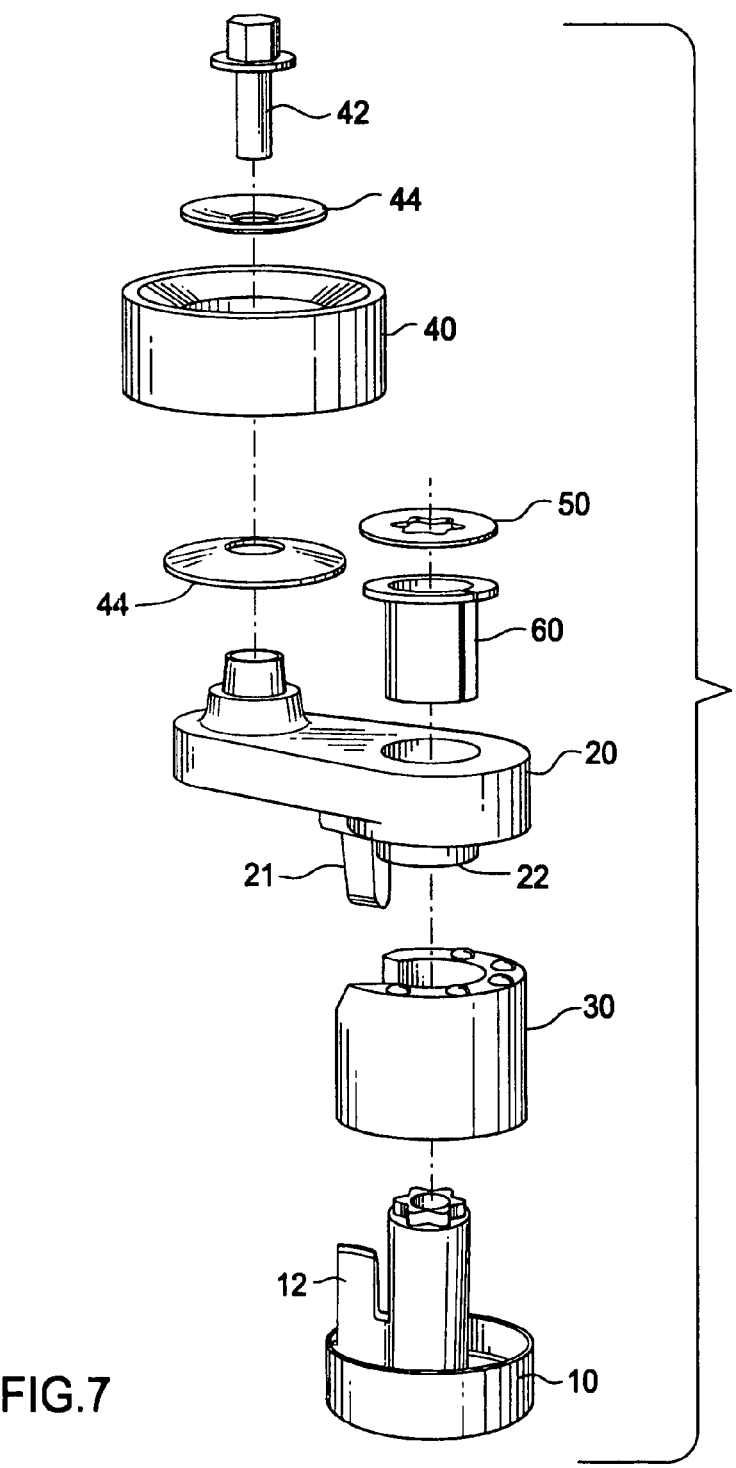
FIG. 7 is an exploded view.

FIG. 7 is an exploded view. In operation, a belt (not shown) is engaged with pulley 40. As a belt tension changes the arm 20 pivots about base 10. Since resilient member 30 is captured between portion 12 and portion 21, any pivotal movement of arm 20 whereby a belt tension (load) is increased is resisted through compression of resilient member 30. This is because movement of arm 20 causes portion 21 to move toward portion 12 in recess 13.

In a predetermined operating condition, for example, in an "unloaded" position portion 12 is held in "back to back" contact with portion 21 by resilient member 30.

Dust covers 44 protect bearing 43 from debris.

Figure 8:
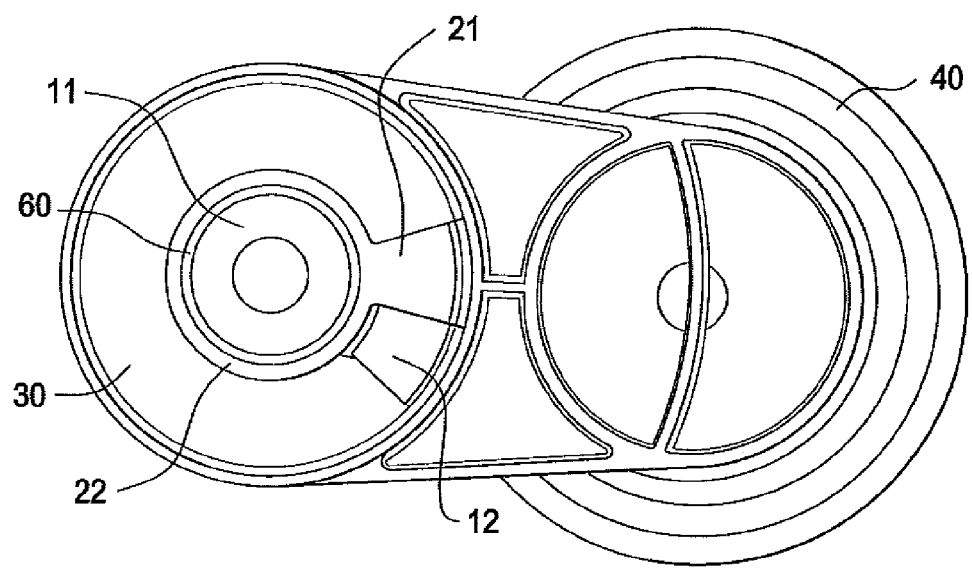
FIG. 8 is a bottom view of the tensioner arm.

FIG. 8 is a bottom view of the tensioner arm. In this view portion 21 is in contact with portion 12. Bore 32 of resilient member 30 is engaged about skirt 22. Portion 12 and portion 21 are each disposed in resilient member gap 31. Sleeve 60 is disposed radially inward of skirt 22, namely, sleeve 60 is between skirt 22 and post 11. Skirt 22 and sleeve 60 are disposed within gap 120 in order to pivotally engage post 11.

Although a form of the invention has been described herein, it will be obvious to those skilled in the art that variations may be made in the construction and relation of parts without departing from the spirit and scope of the invention described herein.

We claim:

1. A tensioner comprising:
   a base comprising a first portion;
   an arm comprising a second portion, the arm pivotally connected to the base;
   a pulley journalled to the arm;
   a resilient member compressively disposed between the first portion and the second portion thereby damping arm oscillations by compression of the resilient member between the first portion and the second portion through pivotal movement of the arm;
   the resilient member comprising a gap within which the first portion and the second portion are disposed;
   the first portion and second portion held in contact by the resilient member when the tensioner is only in an unloaded condition; and
   the resilient member comprising bore, the bore engaging the arm.

2. The tensioner as in claim 1, wherein the resilient member describes a "C" shape.

3. The tensioner as in claim 1, wherein the resilient member comprises either natural rubber or synthetic rubber or a combination thereof.

4. The tensioner as in claim 1, wherein the first portion and the second portion are in contact for a predetermined operating condition.

* * * * *